(12) United States Patent
Zhu et al.

(10) Patent No.: US 9,603,095 B2
(45) Date of Patent: *Mar. 21, 2017

(54) DETERMINATION OF ENHANCED PHYSICAL DOWNLINK CONTROL CHANNEL CANDIDATES IN A WIRELESS COMMUNICATION NETWORK

(71) Applicant: Intel Corporation, Santa Clara, CA (US)

(72) Inventors: Yuan Zhu, Beijing (CN); Xiaogang Chen, Beijing (CN); Seunghee Han, Cupertino, CA (US); Jong-Kae Fwu, Sunnyvale, CA (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/171,402

(22) Filed: Jun. 2, 2016

(65) Prior Publication Data

US 2016/0278060 A1    Sep. 22, 2016

Related U.S. Application Data

(63) Continuation of application No. 14/743,205, filed on Jun. 18, 2015, now Pat. No. 9,386,487, which is a (Continued)

(51) Int. Cl.
*H04W 72/04*    (2009.01)
*H04J 11/00*    (2006.01)
(Continued)

(52) U.S. Cl.
CPC .......... *H04W 52/0258* (2013.01); *H04B 5/00* (2013.01); *H04B 17/318* (2015.01);
(Continued)

(58) Field of Classification Search
CPC ........ H04W 72/04; H04W 72/02; H04J 11/00
See application file for complete search history.

(56) References Cited

U.S. PATENT DOCUMENTS

2013/0242885 A1    9/2013    Zhu et al.
2013/0242904 A1    9/2013    Sartori et al.
(Continued)

FOREIGN PATENT DOCUMENTS

KR    20110112789 A    10/2011
WO    2014/021754 A1    2/2014

OTHER PUBLICATIONS

International Search Report and Written Opinion for International Application No. PCT/US2013/060159, mailed Jan. 14, 2014.
(Continued)

*Primary Examiner* — Charles C Jiang
*Assistant Examiner* — Thad Defauw
(74) *Attorney, Agent, or Firm* — Schwabe, Williamson & Wyatt, P.C.

(57)    ABSTRACT

In embodiments, an evolved Node B (eNB) of a wireless communication network may configure an enhanced physical downlink control channel (EPDCCH) physical resource block (PRB) set for a user equipment (UE). The EPDCCH-PRB set may include a plurality of PRB-pairs. The EPDCCH-PRB set may further include a plurality of enhanced resource element groups (EREGs) organized into localized enhanced control channel elements (ECCEs) having EREGs of the same PRB-pair and distributed ECCEs having EREGs of different PRB-pairs. In some embodiments, the eNB may determine a set of distributed EPDCCH candidates for the UE from the EPDCCH-PRB set, wherein the individual distributed EPDCCH candidates include one or more of the distributed ECCEs, and wherein the set of distributed EPDCCH candidates includes at least one EREG from each of
(Continued)

the plurality of localized ECCEs. Other embodiments may be described and claimed.

21 Claims, 7 Drawing Sheets

Related U.S. Application Data continuation of application No. 13/830,277, filed on Mar. 14, 2013, now Pat. No. 9,107,162.

(60) Provisional application No. 61/707,784, filed on Sep. 28, 2012.

(51) Int. Cl.

| | | |
|---|---|---|
| *H04W 72/02* | (2009.01) | |
| *H04W 52/02* | (2009.01) | |
| *H04W 72/12* | (2009.01) | |
| *H04W 74/00* | (2009.01) | |
| *H04L 5/00* | (2006.01) | |
| *H04L 1/18* | (2006.01) | |
| *H04W 48/14* | (2009.01) | |
| *H04W 76/02* | (2009.01) | |
| *H04W 88/02* | (2009.01) | |
| *H04B 17/318* | (2015.01) | |
| *H04W 24/10* | (2009.01) | |
| *H04W 36/00* | (2009.01) | |
| *H04W 76/04* | (2009.01) | |
| *H04W 4/00* | (2009.01) | |
| *H04W 24/08* | (2009.01) | |
| *H04W 28/02* | (2009.01) | |
| *H04W 40/24* | (2009.01) | |
| *H04W 48/16* | (2009.01) | |
| *H04W 52/04* | (2009.01) | |
| *H04W 52/14* | (2009.01) | |
| *H04B 5/00* | (2006.01) | |
| *H04J 3/16* | (2006.01) | |
| *H04L 5/14* | (2006.01) | |
| *H04L 29/06* | (2006.01) | |
| *H04L 29/08* | (2006.01) | |
| *H04W 8/08* | (2009.01) | |
| *H04W 28/08* | (2009.01) | |
| *H04W 36/22* | (2009.01) | |
| *H04W 48/20* | (2009.01) | |
| *H04L 12/24* | (2006.01) | |
| *H04W 28/16* | (2009.01) | |
| *H04W 24/02* | (2009.01) | |
| *H04W 40/00* | (2009.01) | |
| *H04W 76/06* | (2009.01) | |
| *H04W 72/00* | (2009.01) | |
| *H04W 80/10* | (2009.01) | |
| *H04W 36/08* | (2009.01) | |
| *H04W 48/18* | (2009.01) | |
| *H04W 88/18* | (2009.01) | |
| *H04W 88/08* | (2009.01) | |
| *H04W 88/14* | (2009.01) | |
| *H04W 88/16* | (2009.01) | |

(52) U.S. Cl.
CPC ............ *H04J 3/1694* (2013.01); *H04J 11/00* (2013.01); *H04J 11/0086* (2013.01); *H04L 1/1812* (2013.01); *H04L 1/1864* (2013.01); *H04L 5/0035* (2013.01); *H04L 5/0055* (2013.01); *H04L 5/0057* (2013.01); *H04L 5/0073* (2013.01); *H04L 5/14* (2013.01); *H04L 41/5032* (2013.01); *H04L 65/4084* (2013.01); *H04L 65/60* (2013.01); *H04L 65/602* (2013.01); *H04L 65/608* (2013.01); *H04L 67/10* (2013.01); *H04W 4/005* (2013.01); *H04W 8/08* (2013.01); *H04W 24/02* (2013.01); *H04W 24/08* (2013.01); *H04W 24/10* (2013.01); *H04W 28/0215* (2013.01); *H04W 28/0221* (2013.01); *H04W 28/0252* (2013.01); *H04W 28/08* (2013.01); *H04W 28/16* (2013.01); *H04W 36/0061* (2013.01); *H04W 36/0083* (2013.01); *H04W 36/0088* (2013.01); *H04W 36/22* (2013.01); *H04W 40/005* (2013.01); *H04W 40/246* (2013.01); *H04W 48/14* (2013.01); *H04W 48/16* (2013.01); *H04W 48/20* (2013.01); *H04W 52/0209* (2013.01); *H04W 52/0212* (2013.01); *H04W 52/0235* (2013.01); *H04W 52/04* (2013.01); *H04W 52/14* (2013.01); *H04W 72/02* (2013.01); *H04W 72/042* (2013.01); *H04W 72/044* (2013.01); *H04W 72/0406* (2013.01); *H04W 72/0413* (2013.01); *H04W 72/0486* (2013.01); *H04W 72/1284* (2013.01); *H04W 74/002* (2013.01); *H04W 74/004* (2013.01); *H04W 76/022* (2013.01); *H04W 76/025* (2013.01); *H04W 76/043* (2013.01); *H04W 76/046* (2013.01); *H04W 76/048* (2013.01); *H04W 76/06* (2013.01); *H04W 88/02* (2013.01); *H04L 5/001* (2013.01); *H04W 36/08* (2013.01); *H04W 48/18* (2013.01); *H04W 52/0261* (2013.01); *H04W 72/005* (2013.01); *H04W 80/10* (2013.01); *H04W 88/08* (2013.01); *H04W 88/14* (2013.01); *H04W 88/16* (2013.01); *H04W 88/18* (2013.01); *Y02B 60/50* (2013.01)

(56) References Cited

U.S. PATENT DOCUMENTS

| | | | |
|---|---|---|---|
| 2014/0003375 A1* | 1/2014 | Nam | H04W 72/0406 370/329 |
| 2014/0078980 A1* | 3/2014 | Frenne | H04L 5/0007 370/329 |
| 2014/0269595 A1 | 9/2014 | Lee et al. | |

OTHER PUBLICATIONS

International Preliminary Report on Patentability mailed Mar. 31, 2015 from International Application No. PCT/US2013/060159.
Office Action issued Feb. 23, 2016 from Japanese Patent Application No. 2015-526773, 3 pages.
Office Action issued Mar. 16, 2016 from Korean Patent Application No. 2015-7005372, 13 pages.
Extended European Search Report issued Apr. 28, 2016 from European Patent Application No. 13840695.4, 10 pages.
Office Action issued Jun. 27, 2016 from Korean Patent Application No. 2015-7005372, 7 pages.
KDDI Corporation, "Mapping of distributed ePDCCH to eREG", R1-123415, 3GPP TSG RAN WG1 Meeting #70, Qingdao, China, Aug. 13-17, 2012.
Intel Corporation, "Search Space Design of ePDCCH", R1-113949, 3GPP TSG RAN WG1 Meeting #67, San Francisco, USA Nov. 14-18, 2011.
Intel Corporation, "On the definition of distributed ePDCCH", R1-121537, 3GPP TSG RAN WG1 Meeting #68bis, Jeju, Korea, Mar. 26-30, 2012.
ZTE Corporation, "Need for multiplexing of localised and distributed ePDCCH parts in same PRBs", R1-122108, 3GPP TSG RAN WG1 Meeting #69, Prague, Czech Republic, May 21-25, 2012.

(56) References Cited

OTHER PUBLICATIONS

Asustek, "Localized and Distributed ePDCCH USS Candidates in same subframe", R1-122613, 3GPP TSG RAN WG1 Meeting #69, Prague, Czech Republic, May 21-25, 2012.
Intel Corporation, "On ePDCCH search space design," 3GPP TSG RAN WG1 Meeting #70, R1-123176, Agenda Item: 7.6.3, Aug. 13-17, 2012, Qingdao, China, 6 pages.
Intel Corporation, "System level comparison of different eREG sizes," 3GPP TSG RAN WG1 Meeting #70, R1-123174, Agenda Item: 7.6.1, Aug. 13-17, 2012, Qingdao, China, 6 pages.
Samsung, "PUCCH Format 1a/1b Resources in Response to ePDCCH Detections," 3GPP TSG RAN WG1 #70, R1-123491, Agenda item: 7.6.6, Aug. 13-17, 2012, Qingdao, China, 3 pages.

* cited by examiner

| | | | | | |
|---|---|---|---|---|---|
| PRBa | EREG0, DECCE0 | EREG4, DECCE1 | EREG8, DECCE2 | EREG12, DECCE3 | LECCE0 |
| | EREG1, DECCE4 | EREG5, DECCE5 | EREG9, DECCE6 | EREG13, DECCE7 | LECCE1 |
| | EREG2, DECCE8 | EREG6, DECCE9 | EREG10, DECCE10 | EREG14, DECCE11 | LECCE2 |
| | EREG3, DECCE12 | EREG7, DECCE13 | EREG11, DECCE14 | EREG15, DECCE15 | LECCE3 |
| PRBb | EREG0, DECCE3 | EREG4, DECCE0 | EREG8, DECCE1 | EREG12, DECCE2 | LECCE0 |
| | EREG1, DECCE7 | EREG5, DECCE4 | EREG9, DECCE5 | EREG13, DECCE6 | LECCE1 |
| | EREG2, DECCE11 | EREG6, DECCE8 | EREG10, DECCE9 | EREG14, DECCE10 | LECCE2 |
| | EREG3, DECCE15 | EREG7, DECCE12 | EREG11, DECCE13 | EREG15, DECCE14 | LECCE3 |
| PRBc | EREG0, DECCE2 | EREG4, DECCE3 | EREG8, DECCE0 | EREG12, DECCE1 | LECCE0 |
| | EREG1, DECCE6 | EREG5, DECCE7 | EREG9, DECCE4 | EREG13, DECCE5 | LECCE1 |
| | EREG2, DECCE10 | EREG6, DECCE11 | EREG10, DECCE8 | EREG14, DECCE9 | LECCE2 |
| | EREG3, DECCE14 | EREG7, DECCE15 | EREG11, DECCE12 | EREG15, DECCE13 | LECCE3 |
| PRBd | EREG0, DECCE1 | EREG4, DECCE2 | EREG8, DECCE3 | EREG12, DECCE0 | LECCE0 |
| | EREG1, DECCE5 | EREG5, DECCE6 | EREG9, DECCE7 | EREG13, DECCE4 | LECCE1 |
| | EREG2, DECCE9 | EREG6, DECCE10 | EREG10, DECCE11 | EREG14, DECCE8 | LECCE2 |
| | EREG3, DECCE13 | EREG7, DECCE14 | EREG11, DECCE15 | EREG15, DECCE12 | LECCE3 |

Figure 3

| ECCE index | AGGL 1 candidate index | AGGL 2 candidate index | AGGL 4 candidate index | AGGL 4 candidate index |
|---|---|---|---|---|
| 0 | 0 | | 0 | 0 |
| 1 | 4 | | 0 | 0 |
| 2 | | 0 | 0 | 0 |
| 3 | | 0 | 0 | 0 |
| 4 | 1 | 4 | 0 | 0 |
| 5 | | 4 | 0 | 0 |
| 6 | | 1 | 0 | 0 |
| 7 | | 1 | 0 | 0 |
| 8 | 2 | | 1 | 1 |
| 9 | 5 | | 1 | 1 |
| 10 | | 2 | 1 | 1 |
| 11 | | 2 | 1 | 1 |
| 12 | 3 | 5 | 1 | 1 |
| 13 | | 5 | 1 | 1 |
| 14 | | 3 | 1 | 1 |
| 15 | | 3 | 1 | 1 |

DETERMINATION OF ENHANCED PHYSICAL DOWNLINK CONTROL CHANNEL CANDIDATES IN A WIRELESS COMMUNICATION NETWORK

CROSS REFERENCE TO RELATED APPLICATIONS

The present application is a continuation of U.S. patent application Ser. No. 14/743,205, filed Jun. 18, 2015, entitled "DETERMINATION OF ENHANCED PHYSICAL DOWNLINK CONTROL CHANNEL CANDIDATES IN A WIRELESS COMMUNICATION NETWORK," which is a continuation of U.S. patent application Ser. No. 13/830,277, filed Mar. 14, 2013, entitled "DETERMINATION OF ENHANCED PHYSICAL DOWNLINK CONTROL CHANNEL CANDIDATES IN A WIRELESS COMMUNICATION NETWORK," which claims priority to U.S. Provisional Patent Application No. 61/707,784, filed Sep. 28, 2012, entitled "ADVANCED WIRELESS COMMUNICATION SYSTEMS AND TECHNIQUES". The entire disclosures of which are hereby incorporated by reference in their entireties.

FIELD

Embodiments of the present invention relate generally to the field of communications, and more particularly, to determination of enhanced physical downlink control channel candidates in a wireless communication network.

BACKGROUND

In wireless communication networks, an evolved Node B (eNB) transmits a control channel, such as an enhanced physical downlink control channel (EPDCCH) to a user equipment (UE). The EPDCCH includes downlink control information (DCI) with information used by the UE to receive a physical downlink shared channel (PDSCH). In many wireless communication networks, the eNB may use either localized or distributed transmission of the ePDCCH.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 is a diagram illustrating a mapping scheme for mapping of enhanced resource element groups (eREGs) of the PRB pairs of the EPDCCH-PRB set of FIG. 2 to respective distributed enhanced control channel elements (ECCEs), in accordance with various embodiments.

DETAILED DESCRIPTION

Illustrative embodiments of the present disclosure include, but are not limited to, methods, systems, and apparatuses for mapping enhanced physical downlink control channels in a wireless communication network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
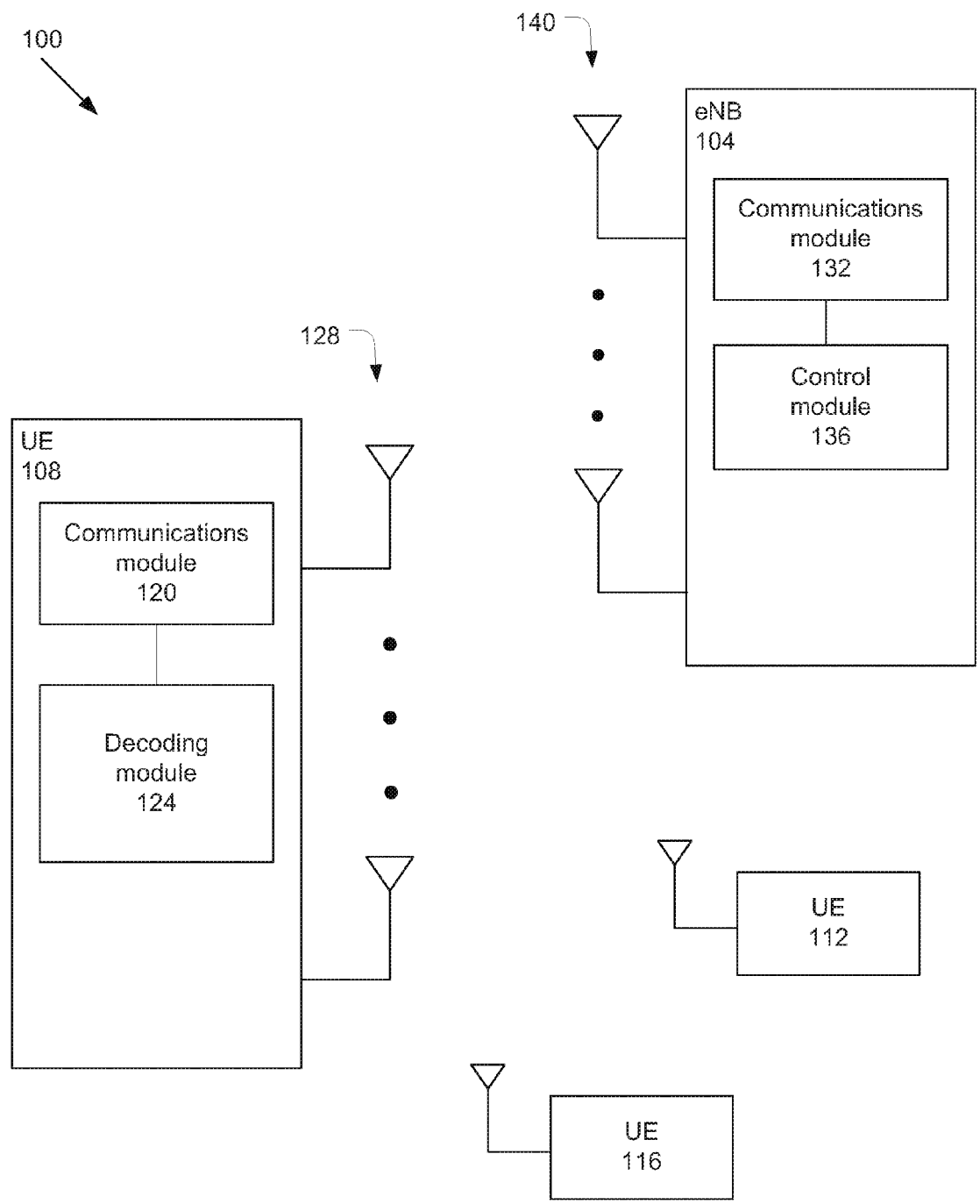
FIG. 1 is a block diagram illustrating wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal mobile telecommunication system (UMTS) terrestrial radio access network (E-UTRAN). The network 100 may include a base station, e.g., evolved Node B (eNB) 104, configured to wirelessly communicate with a user equipment (UE) 108. The network 100 may further include one or more additional UEs, e.g., UEs 112 and 116, that wirelessly communicate with eNB 104.

The UE 108 may include a communications module 120 and a decoding module 124 coupled with one another. The communications module 120 may communicate (e.g., transmit and/or receive) with the eNB 104 over the network 100. The decoding module 124 may decode control channels received by the communications module 120, as further discussed below.

The communications module 120 may be further coupled to one or more antennas 128 to facilitate communication over the network 100. The UE 108 may include any suitable number of antennas 128. In various embodiments, the UE 108 may include at least as many antennas 128 as a number of simultaneous spatial layers or streams received by the UE 108 from the eNB 104, although the scope of the present disclosure may not be limited in this respect.

One or more of the antennas 128 may be alternately used as transmit or receive antennas. Alternatively, or additionally, one or more of the antennas 128 may be dedicated receive antennas or dedicated transmit antennas.

Though not shown explicitly, the UEs 112 and 116 may include modules/components similar to those of the UE 104.

eNB 104 may include a communications module 132 and a control module 136 coupled with one another. The communications module 132 may be further coupled with one or more antennas 140 of the eNB 104. The communications module 132 may communicate (e.g., transmit and/or receive) with one or more UEs (e.g., UEs 108, 112, and/or 116) over the network 100. In various embodiments, the eNB 104 may include at least as many antennas 140 as a number of simultaneous transmission streams transmitted to the UE 108, although the scope of the present disclosure may not be limited in this respect. One or more of the antennas 140 may be alternately used as transmit or receive antennas. Alternatively, or additionally, one or more of the antennas 140 may be dedicated receive antennas or dedicated transmit antennas.

In various embodiments, the control module 136 may generate an enhanced physical downlink control channel (EPDCCH) for transmission to the UE 108. The EPDCCH may include downlink control information (DCI) for the UE 108. The DCI may include, for example, information related to scheduling of downlink resources for a physical downlink shared channel (PDSCH), scheduling of uplink resources for a physical uplink shared channel (PUSCH), and/or transmit power control commands for the PUSCH and/or a physical uplink control channel (PUCCH).

In various embodiments, the control module 136 may configure, for the UE 108, an EPDCCH-physical resource block (EPDCCH-PRB) set including a plurality of physical resource block (PRB) pairs. The plurality of PRB-pairs may include a plurality of enhanced control channel elements (ECCEs) and the ECCEs may include a plurality of enhanced resource element groups (EREGs). The control module 136 may then determine a set of EPDCCH candidates for the UE from the EPDCCH-PRB set. The EPDCCH candidates may correspond to one or more ECCEs of the EPDCCH-PRB set that the UE is to monitor for an EPDCCH for the UE 108.

The EREGs of the plurality of PRB-pairs may be organized into localized ECCEs having EREGs of a same PRB-pair and distributed ECCEs having EREGs distributed among the plurality of PRB-pairs. For example, the distributed ECCEs may include one or more EREGs from each PRB-pair of the EPDCCH-PRB set.

Figure 2:
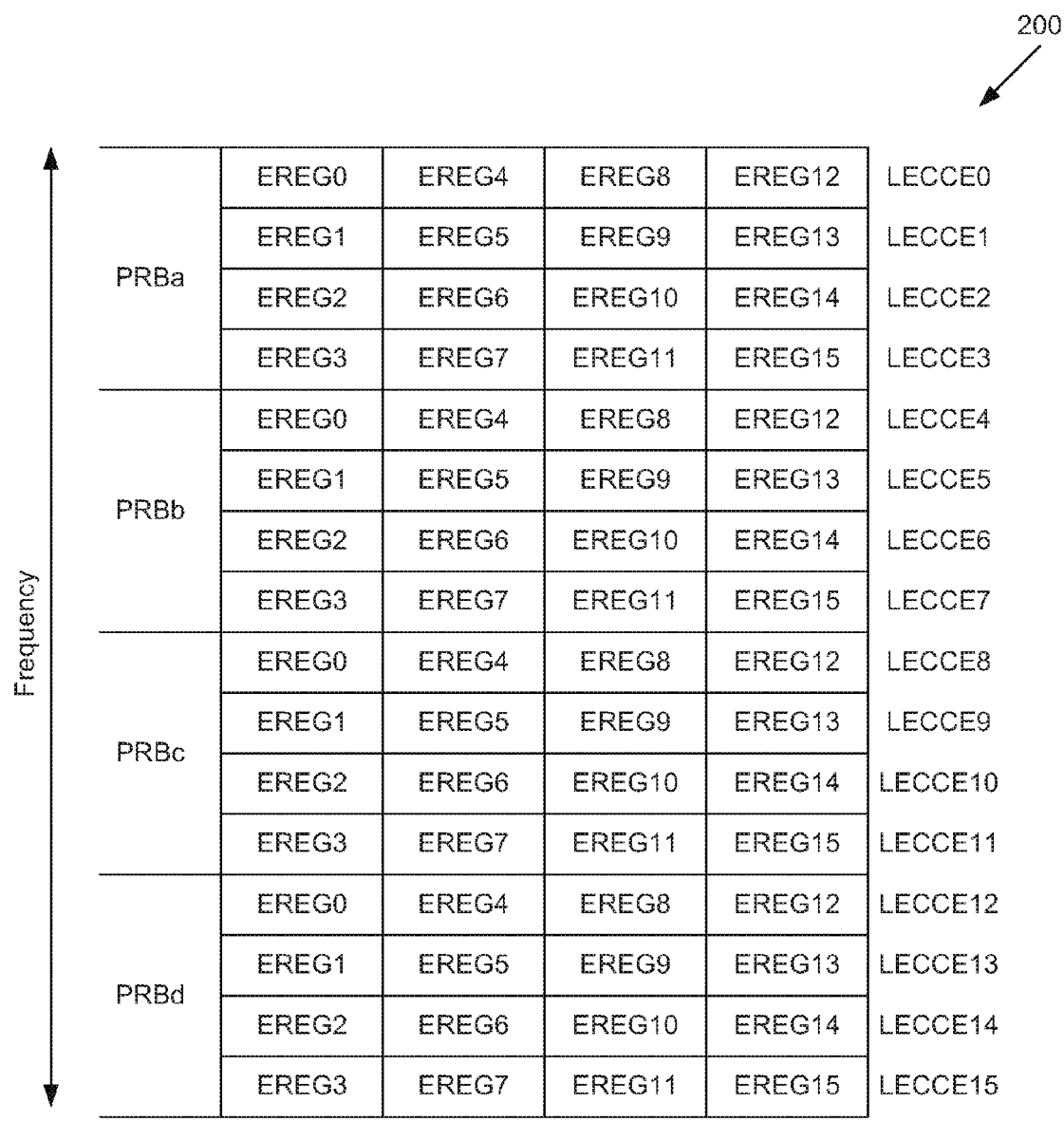
FIG. 2 is a block diagram of an enhanced physical downlink control channel (EPDCCH) physical resource block (PRB) set in accordance with various embodiments.

FIG. 2 illustrates an EPDCCH-PRB set 200 in accordance with some embodiments. The EPDCCH-PRB set 200 includes four PRB-pairs (e.g., PRBa, PRBb, PRBc, and PRBd). Other embodiments may include another number of PRB-pairs. In some embodiments, the PRBs of the EPDCCH-PRB set 200 may be separated in the frequency domain. For example, the PRBs of the EPDCCH-PRB set 200 may be distributed in a control region of the frequency spectrum used by the wireless network (e.g., wireless network 100).

The individual PRB pairs (e.g., PRBa, PRBb, PRBc, and PRBd) of the EPDCCH-PRB set 200 may include a plurality of EREGs (e.g., 16 EREGs including EREG0, EREG1, . . . , EREG15). The EREGs may be organized into localized ECCEs having EREGs from the same PRB-pair. In some embodiments, the localized ECCEs may include EREGs of the same frequency. For example, the individual PRB-pairs may include four localized ECCEs (e.g., LECCE0, LECCE1, LECCE2, and LECCE3). LECCE0 may include EREG0, EREG4, EREG8, and EREG12, which may all have the same frequency and may be different in the time domain. In various embodiments, the number, n, of localized ECCEs of the EPDCCH-PRB set may be indexed from 0 to n−1 (e.g., LECCE0 to LECCE15 for EPDCCH-PRB set 200).

In various embodiments, the EREGs of the EPDCCH-PRB set 200 may further be organized into distributed ECCEs having EREGs from different PRB-pairs. For example, in some embodiments, the EPDCCH-PRB set 200 may include sixteen distributed ECCEs with the individual distributed ECCEs including the EREGs of the plurality of PRB-pairs with the same index (e.g., EREG0 of PRBa, PRBb, PRBc, and PRBd). The distributed ECCEs may be indexed from 0 to n−1 (e.g., DECCE0 to DECCE15 for EPDCCH-PRB set 200). In some embodiments, the indexes of the distributed ECCEs may increase first within the same set of localized ECCEs before proceeding to the next set of localized ECCEs.

For example, FIG. 3 illustrates an EPDCCH-PRB set 300 showing the mapping of EREGs to distributed ECCEs. The EPDCCH-PRB set 300 may correspond to the EPDCCH-PRB set 200 of FIG. 2, and may include PRB-pairs PRBa, PRBb, PRBc, and PRBd. The PRB-pairs may include a plurality of localized ECCEs including respective groups of EREGs. The localized ECCEs may include internal indexes within each PRB-pair (e.g., LECCE0, LECCE1, LECCE2, and LECCE3).

In various embodiments, the individual distributed ECCEs may include EREGs from a plurality of the PRB-pairs. For example, the distributed ECCEs may include one EREG from each of the PRB-pairs of the EPDCCH-PRB set 300. In some embodiments, an individual distributed ECCE may include EREGs from the same localized ECCE (e.g., ECCE0) of different PRB-pairs. In some embodiments, the EREGs of the same distributed ECCE may include an EREG of a different index from each of the PRB-pairs. For example, as shown in FIG. 3, DECCE0 may include EREG0 from PRBa, EREG4 from PRBb, EREG8 from PRBc and EREG12 from PRBd. Additionally, DECCE1 may include EREG4 from the PRBa, EREG8 from PRBb, EREG12 from PRBc and EREG0 from PRBd. DECCE4 may include EREG1 from PRBa, EREG5 from PRBb, EREG9 from PRBc and EREG13 from PRBd.

In various embodiments, the control module 136 may determine a set of EPDCCH candidates from the EPDCCH-PRB set. The EPDCCH candidates may correspond to one or more ECCEs of the EPDCCH-PRB set. The set of EPDCCH candidates may be referred to as blind decoding candidates, and may define a UE-specific search space of the UE 108. The control module 136 may transmit an EPDCCH for the UE 108, via the communications module 132, on one of the EPDCCH candidates. The decoding module 124 of the UE 108 may monitor the EPDCCH candidates, and may decode EPDCCHs received on all of the EPDCCH candidates to find the EPDCCH designated for the UE 108. The UE 108 may successfully decode the PDCCH designated for the UE 108 by using a UE-specific scrambling code.

In various embodiments, the control module 136 may configure the EPDCCH-PRB set for the UE as either a localized EPDCCH-PRB set used to indicate localized EPDCCH candidates or a distributed EPDCCH-PRB set used to indicate distributed EPDCCH candidates. In some embodiments, the control module 136 may configure a plurality of EPDCCH-PRB sets for the UE 108. The plurality of EPDCCH-PRB sets may be fully overlapping (including all the same PRB-pairs), partially overlapping (including some of the same PRB-pairs), or non-overlapping (including all different PRB-pairs). The plurality of EPDCCH-PRB sets for the UE 108 may be all localized, all distributed, or a combination of localized and distributed EPDCCH-PRB sets.

Additionally, in some embodiments, the control module 136 may configure EPDCCH-PRB sets for other UEs (e.g., UE 112 or UE 116) that may include one or more of the same PRB-pairs as the EPDCCH-PRB set for the UE 108. In some embodiments, the plurality of EPDCCH-PRB sets including the same PRB-pairs may be a combination of localized and distributed EPDCCH-PRB sets.

In various embodiments, the EPDCCH candidates may have an aggregation level that corresponds to a number of ECCEs in the EPDCCH candidate (e.g., the number of ECCEs used to send the EPDCCH over the EPDCCH candidate). For example, the aggregation level may be 1, 2, 4, 8, or another suitable value. The control module 136 may transmit the EPDCCH for the UE 108 on all of the ECCEs in the EPDCCH candidate selected for EPDCCH transmission. For a localized EPDCCH candidate of aggregation level 2 or greater, the localized EPDCCH candidate may first include localized ECCEs of the same PRB-pair until no more localized ECCEs of the same PRB-pair are available, and then may include localized ECCEs of another PRB-pair. For a distributed EPDCCH candidate of aggregation level 2 or greater, the distributed EPDCCH may first include distributed ECCEs from the same set of localized ECCEs until no more distributed ECCEs from the same set of localized ECCEs are available, and may then include distributed ECCEs from a different set of localized ECCEs.

In various embodiments, the set of EPDCCH candidates determined by the control module 136 may include any suitable number of EPDCCH candidates. In some embodiments, the number of EPDCCH candidates determined by the control module 136 for the UE 108 may depend on the aggregation level of the EPDCCH candidates and/or other factors. For example, as further discussed below, in embodiments in which a plurality of EPDCCH-PRB sets are configured for the same UE (e.g., UE 108), the number of EPDCCH candidates determined for the individual EPDCCH-PRB sets may be proportional to the number of PRB-pairs in the respective individual EPDCCH-PRB sets.

In various embodiments, for a localized EPDCCH-PRB set, the control module 136 may spread the localized EPDCCH candidates among the plurality of PRB-pairs of the EPDCCH-PRB set. The different localized EPDCCH candidates may first include ECCEs of different PRB-pairs (e.g., until the set of EPDCCH candidates includes an ECCE in each of the PRB-pairs) and then include ECCEs of a same PRB-pair. For example, if the set of localized EPDCCH candidates include a number of localized EPDCCH candidates that is equal to or more than the number of PRB-pairs in the EPDCCH-PRB set, the localized EPDCCH candidates may include at least one localized ECCE from each of the plurality of PRB-pairs of the EPDCCH-PRB set. If the number of localized EPDCCH candidates in the EPDCCH-PRB set is less than the number of PRB-pairs, the localized EPDCCH candidates may include localized ECCEs from different PRB-pairs.

The spreading of the localized EPDCCH candidates over the PRB-pairs may provide localized EPDCCH candidates over a wide range of frequencies to allow the eNB 104 to take advantage of frequency domain scheduling gain. For example, the UE 108 may provide the eNB 104 with feedback information (e.g., channel state information (CSI)) associated with the PRB-pairs of the EPDCCH-PRB set. The eNB 108 may use the feedback information to determine which EPDCCH candidate to select for sending the EPDCCH for the UE 108.

Prior techniques for determining EPDCCH candidates would select a set of EPDCCH candidates with continuous indexes (e.g., a set of six EPDCCH candidates including ECCE8 to ECCE13). Referring to the EPDCCH-PRB set 200, such a set of EPDCCH candidates would leave two PRB-pairs (e.g., PRBa and PRBb) without an EPDCCH candidate, which would not give the eNB 104 the option of using the frequencies of those PRB-pairs for sending the EPDCCH for the UE 108.

Additionally, or alternatively, in various embodiments, for distributed EPDCCH-PRB set, the control module 136 may spread the distributed EPDCCH candidates among the localized ECCEs of the EPDCCH-PRB set. The different distributed EPDCCH candidates of the set of distributed EPDCCH candidates may first be mapped to distributed ECCEs including EREGs of different localized ECCEs of the PRB-pairs (e.g., until the set of distributed EPDCCH candidates includes at least one EREG of each localized ECCE), and may then be mapped to distributed ECCEs including EREGs of a same localized ECCE as another distributed EPDCCH candidate.

For example, if the number of distributed EPDCCH candidates in the set of distributed EPDCCH candidates is equal to or greater than the number of PRB-pairs in the EPDCCH-PRB set, the set of distributed EPDCCH candidates may include at least one EREG from each of the plurality of localized ECCEs of the EPDCCH-PRB set. If the number of distributed EPDCCH candidates in the EPDCCH-PRB set is less than the number of PRB-pairs, the distributed EPDCCH candidates may include distributed ECCEs associated with EREGs from different localized ECCEs.

The spreading of the distributed EPDCCH candidates over the localized ECCEs may facilitate efficient use of the REGs of the PRB-pairs, in particular in situations in which localized and distributed EPDCCH-PRB sets may be configured for the same PRB-pairs. For example, the spreading of the distributed EPDCCH candidates may reduce blocking of localized EPDCCH candidates by distributed EPDCCH candidates compared with using a set of distributed EPDCCH candidates corresponding to distributed ECCEs with consecutive indexes.

Figure 4:
FIG. 4 is a diagram illustrating an EPDCCH candidate determination scheme for determining ECCEs included in EPDCCH candidates of different aggregation levels, in accordance with various embodiments.

FIG. 4 illustrates a table 400 showing an example set of EPDCCH candidates for aggregation levels 1, 2, 4, and 8 in one localized EPDCCH set and/or one distributed EPDCCH set, in accordance with some embodiments. The sets of EPDCCH candidates for aggregation levels 1 and 2 may include six EPDCCH candidates, while the sets of EPDCCH candidates for aggregation levels 4 and 8 may include two EPDCCH candidates. Other embodiments may include other suitable numbers of EPDCCH candidates for the respective aggregation levels.

In various embodiments, the ECCE indexes shown in table 400 may correspond to the localized ECCEs shown in FIG. 2 or the distributed ECCEs shown in FIG. 3. In some embodiments, the table 400 may be used for both localized ECCEs and distributed ECCEs. With reference to FIGS. 2 and 3, the table 400 may provide localized EPDCCH candidates spread among the PRB-pairs of the EPDCCH-PRB set, and may provide distributed EPDCCH candidates spread among the localized ECCEs of the EPDCCH-PRB set.

For example, for localized EPDCCH candidates of aggregation level 1, the EPDCCH candidates with indexes 0 to 3 may be spread over the four PRB pairs of the EPDCCH-PRB set 200. The EPDCCH candidates with indexes 4 and 5 may be further spread over the frequency spectrum by placing them in PRBa and PRBc. For distributed EPDCCH candidates of aggregation level 1, the distributed EPDCCH candidates with indexes 0 to 3 may collectively include EREGs from all of the localized ECCEs of EPDCCH-PRB set 200.

In some embodiments, the control module 136 may determine the localized and/or distributed EPDCCH candidates based on a search space equation. The search space equation may determine the EPDCCH candidates based on the ECCE indexes included in the EPDCCH candidates. In some embodiments, the same search space equation may be used to determine the localized EPDCCH candidates and the distributed EPDCCH candidates. As discussed above, the same set of ECCE indexes for both localized and distributed EPDCCH candidates may provide localized EPDCCH candidates spread among the PRB-pairs of the EPDCCH-PRB set, and may provide distributed EPDCCH candidates spread among the localized ECCEs of the EPDCCH-PRB set.

In one example, the a set of ECCEs corresponding to an EPDCCH candidate m of the set of distributed EPDCCH candidates, as given by the search space equation:

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor\right\} + i;$$

where p is an identifier of the set of EPDCCH candidates; $Y_{p,k}$ is a starting candidate index for the set of EPDCCH candidates; L is an aggregation level of an EPDCCH to be transmitted on one of the EPDCCH candidates; $M_p^{(L)}$ is a number of EPDCCH candidates in the set of EPDCCH candidates; k is a subframe associated with the UE; $N_{ECCE,p,k}$ is a total number of CCEs in a control region of subframe k in the wireless communication network; i=0, ..., L−1; m=0, 1, ..., $M_p^{(L)}$−1; and b is equal to a carrier indicator field value for a serving cell associated with the set of EPDCCH candidates or 0 (e.g., if no carrier indicator field is configured for the UE).

In various embodiments, the set of EPDCCH candidates may be determined based on a starting candidate index (e.g., $Y_k$). As discussed above, in some embodiments a plurality of sets of EPDCCH candidates may be determined for the UE 108. In some embodiments, different starting candidate indexes may be used to determine the different sets of EPDCCH candidates. That is, the starting candidate index may be specific to the EPDCCH candidate. For example, in some embodiments, the starting candidate indexes for different sets of EPDCCH candidates may be independently determined using different random numbers. In other embodiments, the starting candidate indexes may be separated by a pre-defined offset. Using different starting candidate indexes to determine different sets of EPDCCH candidates for the same UE (e.g., UE 108) may provide separation in the frequency domain between the different sets of EPDCCH candidates. This may provide flexibility for the eNB 104 in choosing between the sets of EPDCCH candidates.

Additionally, or alternatively, in some embodiments, for a UE (e.g., UE 108) that is configured with multiple EPDCCH-PRB sets, the number of EPDCCH candidates for the individual EPDCCH-PRB sets may be proportional to a number of PRB-pairs in the EPDCCH-PRB set. For example, the eNB 104 may configure first and second EPDCCH-PRB sets for the UE 108. The first EPDCCH-PRB set may include a first number of PRB-pairs, and the second EPDCCH-PRB set may include a second number of PRB-pairs. In various embodiments, a ratio of a number of EPDCCH candidates in the first set of EPDCCH candidates to a number of EPDCCH candidates in the second set of EPDCCH candidates may be about equal to a ratio of the first number of PRB-pairs to the second number of PRB-pairs. By "about equal," it is meant that the ratios may be equal or may differ slightly because of rounding to whole numbers of PRB-pairs and/or EPDCCH candidates. The ratio of number of EPDCCH candidates in the first set of EPDCCH candidates compared with the number of EPDCCH candidates in the second set of EPDCCH candidates may be measured with a same aggregation level.

In one example, the first EPDCCH-PRB set may include eight PRB-pairs and the second EPDCCH-PRB set may include four PRB-pairs. Accordingly, the first set of EPDCCH candidates for the first EPDCCH-PRB set may include twice as many EPDCCH candidates as the second set of EPDCCH candidates for the second EPDCCH-PRB set. For example, if 18 total EPDCCH candidates are to be determined, the first set of EPDCCH candidates may include 12 EPDCCH candidates and the second set of EPDCCH candidates may include 6 EPDCCH candidates.

Accordingly, the number of EPDCCH candidates for each EPDCCH-PRB set may be determined based on the number of PRB-pairs in the EPDCCH-PRB set. This may help balance the loading of the PRB-pairs between the multiple EPDCCH-PRB sets.

Figure 5:
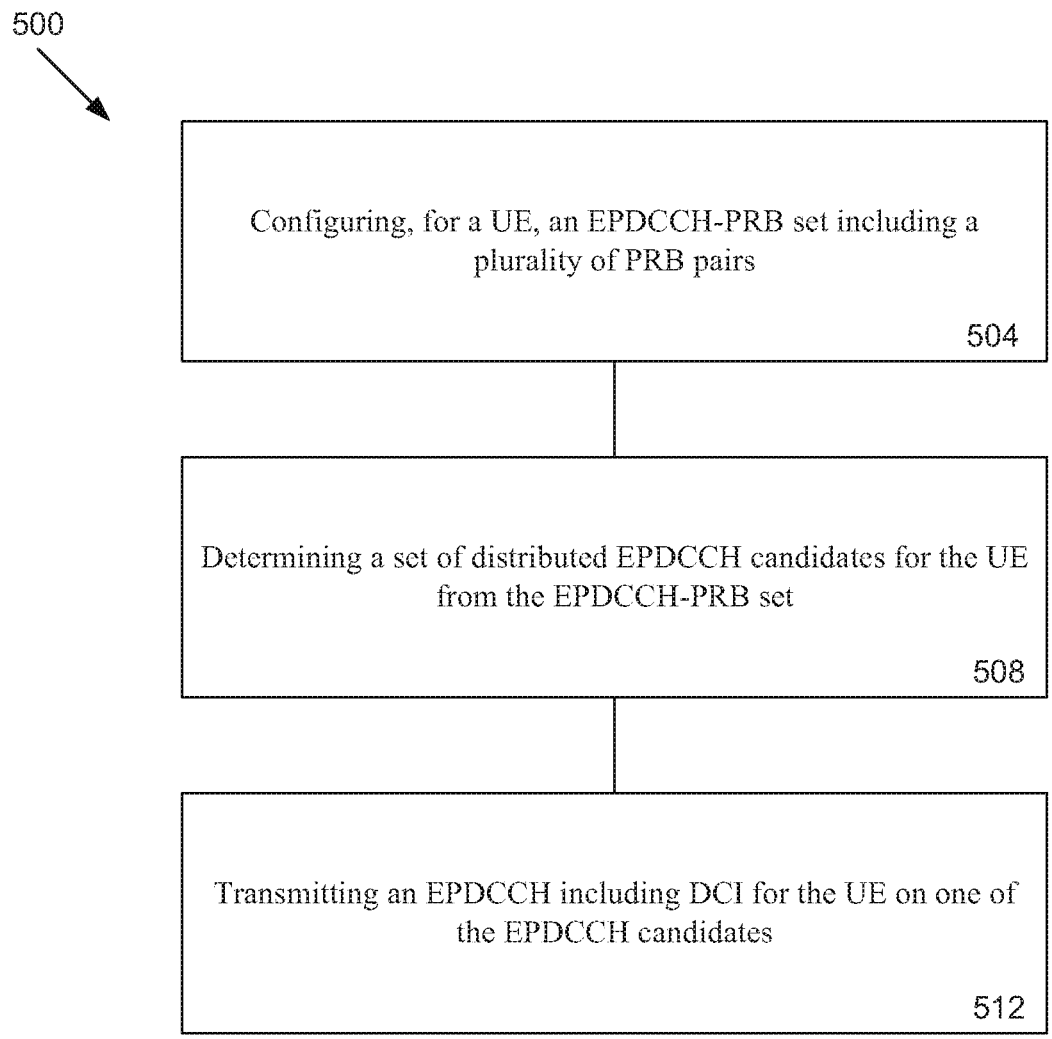
FIG. 5 is a flowchart illustrating a method of configuring a UE specific search space that may be performed by an evolved Node B (eNB) in accordance with various embodiments.

FIG. 5 illustrates a method 500 that may be performed by an eNB (e.g., eNB 104) in accordance with various embodiments. In some embodiments, the eNB may include and/or have access to one or more computer-readable media having instructions stored thereon, that, when executed, cause the eNB to perform the method 500.

At 504 the method 500 may include configuring, for a UE (e.g., UE 108), an EPDCCH-PRB set (e.g., EPDCCH-PRB set 200) including a plurality of PRB pairs. The plurality of PRB-pairs may include a plurality of EREGs arranged into a plurality of localized ECCEs having EREGs of a same PRB-pair and a plurality of distributed ECCEs having EREGs distributed among the plurality of PRB-pairs.

At 508, the method 500 may further include determining a set of distributed EPDCCH candidates for the UE from the EPDCCH-PRB set. The individual distributed EPDCCH candidates may include one or more of the distributed ECCEs. The different distributed EPDCCH candidates may be spread among different localized ECCEs of the PRB-pairs, as described herein. In some embodiments, the set of distributed EPDCCH candidates may include at least one EREG from each of the plurality of localized ECCEs.

In some embodiments, the method 500 may further include determining a set of localized EPDCCH candidates for the UE or another UE. In some embodiments, the set of distributed EPDCCH candidates and the set of localized EPDCCH candidates may be determined based on the same search space equation. In some embodiments, the set of localized EPDCCH candidates may include localized ECCEs of each of the plurality of PRB-pairs of the EPDCCH-PRB set. In some embodiments, the set of localized EPDCCH candidates and the set of distributed EPDCCH candidates may be determined using different starting candidate indexes.

At 512, the method 500 may further include transmitting an EPDCCH including DCI for the UE on one of the EPDCCH candidates.

Figure 6:
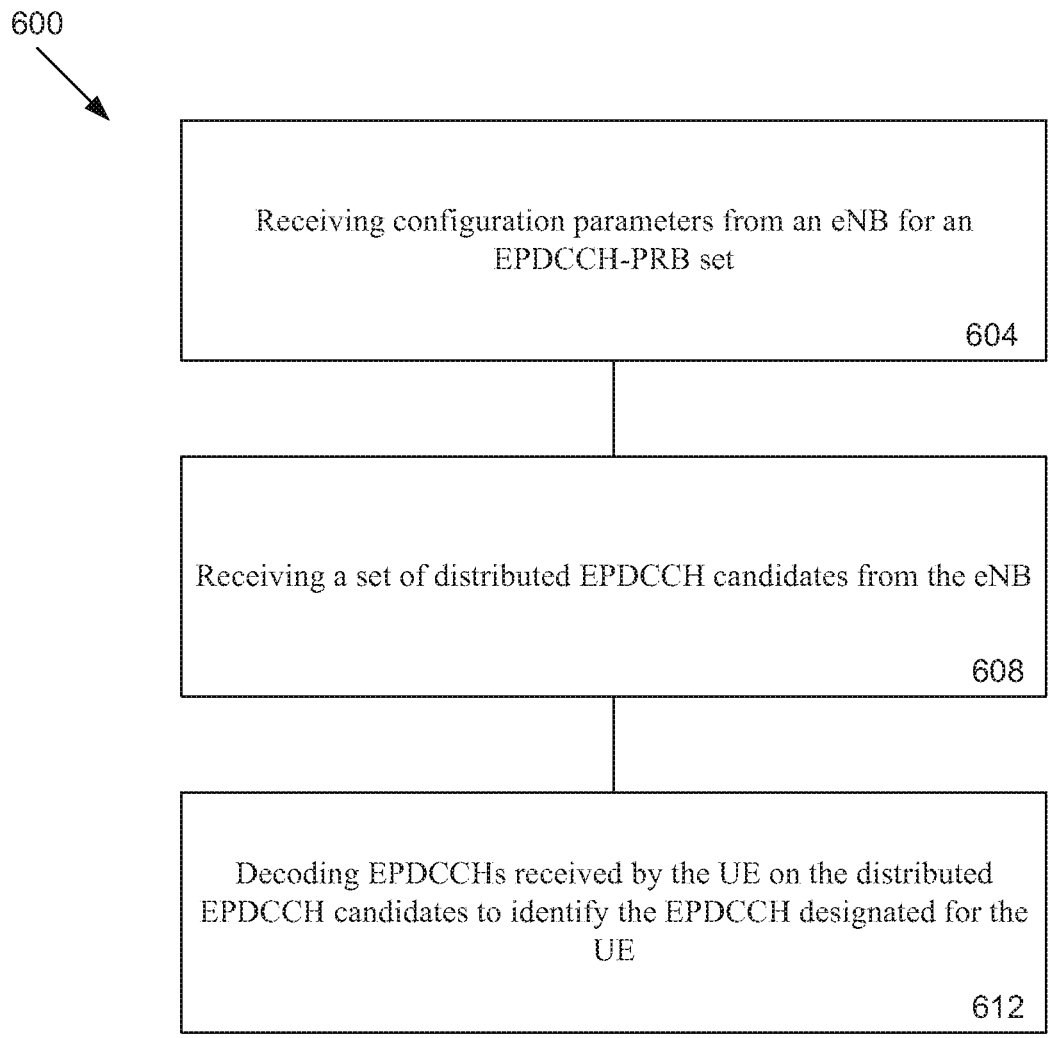
FIG. 6 is a flowchart illustrating a method to facilitate receiving an EPDCCH that may be performed by a user equipment in accordance with various embodiments.

FIG. 6 illustrates a method 600 that may be performed by a UE (e.g., UE 108) in accordance with various embodiments. In some embodiments, the UE may include and/or have access to one or more computer-readable media having instructions stored thereon, that, when executed, cause the UE to perform the method 600.

At 604, the method 600 may include receiving configuration parameters from an eNB (e.g., eNB 104) for an EPDCCH-PRB set. The EPDCCH-PRB set may include a plurality of PRB-pairs, and the PRB-pars may include a plurality of distributed ECCEs having EREGs of more than one of the PRB-pairs.

At 608, the method 600 may include receiving a set of distributed EPDCCH candidates from the eNB. The individual distributed EPDCCH candidates may include one or more of the distributed ECCEs of the EPDCCH-PRB set. The different distributed EPDCCH candidates may be spread among different localized ECCEs of the PRB-pairs, as described herein. In some embodiments, the set of distributed EPDCCH candidates may include at least one EREG from each of a plurality of localized ECCEs of the PRB-pairs.

At 612, the method 600 may include decoding EPDCCHs received by the UE on the distributed EPDCCH candidates to identify the EPDCCH designated for the UE.

In some embodiments, the UE may further receive configuration parameters for another EPDCCH-PRB set. The UE may also receive another set of EPDCCH candidates corresponding to groups of one or more distributed or localized ECCEs of the other EPDCCH-PRB set. In some embodiments, the second EPDCCH-PRB set may at least partially overlap with the first EPDCCH-PRB set (e.g., may include one or more of the same PRB-pairs).

Figure 7:
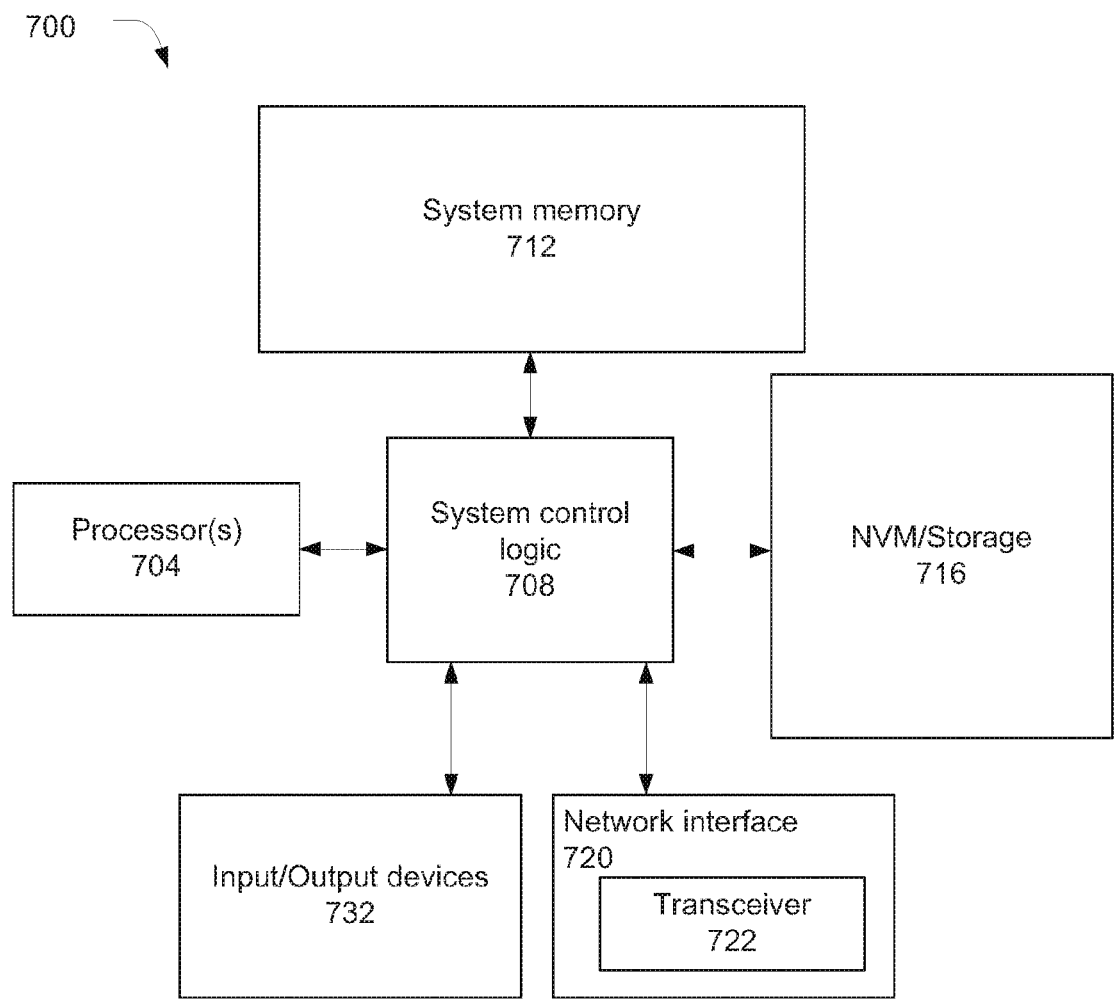
FIG. 7 is a block diagram illustrating an example computing system in accordance with various embodiments.

The eNB 104 and/or UE 108 described herein may be implemented into a system using any suitable hardware and/or software to configure as desired. FIG. 7 illustrates, for one embodiment, an example system 700 comprising one or more processor(s) 704, system control logic 708 coupled with at least one of the processor(s) 704, system memory 712 coupled with system control logic 708, non-volatile memory (NVM)/storage 716 coupled with system control logic 708, a network interface 720 coupled with system control logic 708, and input/output (I/O) devices 732 coupled with system control logic 708.

The processor(s) 704 may include one or more single-core or multi-core processors. The processor(s) 704 may include any combination of general-purpose processors and dedicated processors (e.g., graphics processors, application processors, baseband processors, etc.).

System control logic 708 for one embodiment may include any suitable interface controllers to provide for any suitable interface to at least one of the processor(s) 704 and/or to any suitable device or component in communication with system control logic 708.

System control logic 708 for one embodiment may include one or more memory controller(s) to provide an interface to system memory 712. System memory 712 may be used to load and store data and/or instructions, for example, for system 700. System memory 712 for one embodiment may include any suitable volatile memory, such as suitable dynamic random access memory (DRAM), for example.

NVM/storage 716 may include one or more tangible, non-transitory computer-readable media used to store data and/or instructions, for example. NVM/storage 716 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 716 may include a storage resource physically part of a device on which the system 700 is installed or it may be accessible by, but not necessarily a part of, the device. For example, the NVM/storage 716 may be accessed over a network via the network interface 720 and/or over Input/Output (I/O) devices 732.

Network interface 720 may have a transceiver 722 to provide a radio interface for system 700 to communicate over one or more network(s) and/or with any other suitable device. The transceiver 722 may implement communications module 120 of UE 108 or communications module 132 of eNB 104. In various embodiments, the transceiver 722 may be integrated with other components of system 700. For example, the transceiver 722 may include a processor of the processor(s) 704, memory of the system memory 712, and NVM/Storage of NVM/Storage 716. Network interface 720 may include any suitable hardware and/or firmware. Network interface 720 may include a plurality of antennas to provide a multiple input, multiple output radio interface. Network interface 720 for one embodiment may include, for example, a wired network adapter, a wireless network adapter, a telephone modem, and/or a wireless modem.

For one embodiment, at least one of the processor(s) 704 may be packaged together with logic for one or more controller(s) of system control logic 708. For one embodiment, at least one of the processor(s) 704 may be packaged together with logic for one or more controllers of system control logic 708 to form a System in Package (SiP). For one embodiment, at least one of the processor(s) 704 may be integrated on the same die with logic for one or more controller(s) of system control logic 708. For one embodiment, at least one of the processor(s) 704 may be integrated on the same die with logic for one or more controller(s) of system control logic 708 to form a System on Chip (SoC).

In various embodiments, the I/O devices 732 may include user interfaces designed to enable user interaction with the system 700, peripheral component interfaces designed to enable peripheral component interaction with the system 700, and/or sensors designed to determine environmental conditions and/or location information related to the system 700.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 720 to communicate with components of a positioning network, e.g., a global positioning system (GPS) satellite.

In various embodiments, the system 700 may be a mobile computing device such as, but not limited to, a laptop computing device, a tablet computing device, a netbook, a smartphone, etc. In various embodiments, system 700 may have more or less components, and/or different architectures.

EXAMPLES

Various embodiments provide an apparatus including: a communications module to communicate with a UE over a wireless communication network; and a control module coupled to the communications module. The control module is to: configure, for the UE, an EPDCCH-PRB set including a plurality of PRB-pairs, wherein the EPDCCH-PRB set is configured as a distributed EPDCCH-PRB set having distributed ECCEs that include EREGs spread among the plurality of PRB-pairs; and determine a set of distributed EPDCCH candidates for the UE from the PRB-pairs of the EPDCCH-PRB set, wherein the individual distributed EPDCCH candidates include one or more of the distributed ECCEs, and wherein the different distributed EPDCCH candidates of the set of distributed EPDCCH candidates are first mapped to distributed ECCEs including EREGs of different localized ECCEs of the PRB-pairs, and then mapped to distributed ECCEs including EREGs of a same localized ECCE as another distributed EPDCCH candidate.

In some embodiments, the EPDCCH-PRB set is a first EPDCCH-PRB set, wherein the control module is to determine the set of distributed EPDCCH candidates based on a search space equation, and wherein the control module is further to: configure, for the UE or another UE, a second EPDCCH-PRB set including a plurality of PRB-pairs that are fully overlapped, partially overlapped, or fully non-overlapped with the PRB-pairs of the first EPDCCH-PRB set, wherein the second EPDCCH-PRB set is configured as a localized EPDCCH-PRB set including a plurality of localized ECCEs having EREGs of a same PRB-pair; and determine, based on the search space equation, a set of localized EPDCCH candidates for the UE or the another UE from the second EPDCCH-PRB set. In some such embodiments, the set of localized EPDCCH candidates includes localized ECCEs of each of the plurality of PRB-pairs of the second EPDCCH-PRB set.

In some embodiments, the EPDCCH-PRB set includes four PRB-pairs and sixteen distributed ECCEs, and wherein the individual PRB-pairs include four localized ECCEs.

In some embodiments, the set of distributed EPDCCH candidates is a first set of EPDCCH candidates, wherein the control module is further configured to determine a second set of EPDCCH candidates for the UE, and wherein the control module is configured to determine the first and second sets of EPDCCH candidates based on respective first and second starting candidate indexes that are different from one another. In some such embodiments, the first and second starting candidate indexes are separated by a pre-defined offset.

In some embodiments, the control module is further configured to transmit an EPDCCH including DCI for the UE on one of the distributed EPDCCH candidates.

In some embodiments, a set of ECCEs corresponding to an EPDCCH candidate m of the set of distributed EPDCCH candidates is given by $$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor\right\} + i;$$

where p is an identifier of the set of distributed EPDCCH candidates; $Y_{p,k}$ is a starting candidate index for the set of distributed EPDCCH candidates; L is an aggregation level of an EPDCCH to be transmitted on one of the distributed EPDCCH candidates; $M_p^{(L)}$ is a number of EPDCCH candidates in the set of distributed EPDCCH candidates; k is a subframe associated with the UE; $N_{ECCE,p,k}$ is a total number of CCEs in a control region of subframe k in the wireless communication network; i=0, . . . , L−1; m=0, 1, . . . , $M_p^{(L)}$−1; and b is equal to a carrier indicator field value for a serving cell associated with the set of distributed EPDCCH candidates or 0.

Some embodiments provide that the EPDCCH-PRB set is a first EPDCCH-PRB set having a first number of PRB-pairs, and that the control module is further to: configure the UE with a second EPDCCH-PRB set having a second number of PRB-pairs; wherein the second EPDCCH-PRB set is a distributed EPDCCH-PRB set or a localized EPDCCH-PRB set; and wherein a number of EPDCCH candidates in the set of distributed EPDCCH candidates of the first EPDCCH-PRB set is based on a proportion of the first number of PRB-pairs relative to the second number of PRB-pairs.

Some embodiments provide an eNB comprising the apparatus as described above, and further comprising an Ethernet connection.

In various embodiments, an apparatus to be employed by an eNB to facilitate transmission of a control channel includes: a communications module to communicate with a UE over a wireless communication network; and a control module coupled to the communications module. The control module is to: configure, for one or more UEs, a localized EPDCCH-PRB set having a plurality of localized ECCEs, and a distributed EPDCCH-PRB set having a plurality of distributed ECCEs; and determine, based on a search space equation, a set of localized EPDCCH candidates, wherein the individual localized EPDCCH candidates correspond to one or more localized ECCEs of the localized EPDCCH-PRB set; and determine, based on the search space equation, a set of distributed EPDCCH candidates, wherein the individual distributed EPDCCH candidates correspond to one or more of the distributed ECCEs of the distributed EPDCCH-PRB set.

In some embodiments, the set of localized EPDCCH candidates includes ECCEs of each of the plurality of PRB-pairs of the localized EPDCCH-PRB set.

In some embodiments, the different distributed EPDCCH candidates of the set of distributed EPDCCH candidates are first mapped to distributed ECCEs including EREGs of different localized ECCEs of the PRB-pairs, and then mapped to distributed ECCEs including EREGs of a same localized ECCE as another distributed EPDCCH candidate.

In some embodiments, the localized ECCEs are associated with a first set of PRB-pairs, wherein the distributed ECCEs are associated with a second set of PRB-pairs, and wherein the first and second sets of PRB-pairs include one or more common PRB-pairs.

In some embodiments, the distributed EPDCCH candidates have an aggregation level indicating a number of distributed ECCEs included in the individual distributed EPDCCH candidates, wherein the distributed EPDCCH candidates have an aggregation level of 2 or greater, and wherein the individual distributed EPDCCH candidates are first mapped to distributed EREGs from a same set of localized ECCEs of the PRB-pairs, and then mapped to distributed EREGs from a different set of localized ECCEs if no EREGs in the same set of localized ECCEs are available.

In some embodiments, the search space equation determines the EPDCCH candidates based on indexes associated with the corresponding ECCEs, wherein the indexes of the localized ECCEs of the localized EPDCCH-PRB set are continuous, and wherein the indexes of the distributed ECCEs of the distributed EPDCCH-PRB set are continuous.

In some embodiments, the EPDCCH-PRB set includes four PRB-pairs, and wherein the individual PRB-pairs include four ECCEs.

In various embodiments, an apparatus to be employed by a UE to facilitate receiving control information includes: a communications module configured to communicate with an eNB over a wireless communication network; and a decoding module configured to decode an EPDCCH received at one or more of a plurality of EPDCCH candidates of a first set of EPDCCH candidates and a second set of EPDCCH candidates; wherein the first set of EPDCCH candidates is determined based on a first starting candidate index and the second set of EPDCCH candidates is determined based on a second starting candidate index that is different from the first starting candidate index.

In some embodiments, the first and second starting candidate indexes are separated by a pre-defined offset.

In some embodiments, the first and second starting candidate indexes are independently determined using different random numbers.

In some embodiments, the EPDCCH candidates of the first and second sets correspond to one or more ECCEs of respective first or second EPDCCH-PRB sets.

In some embodiments, the first EPDCCH-PRB set is a localized EPDCCH-PRB set including a plurality of localized ECCEs having EREGs of a same PRB-pair, and the second EPDCCH-PRB set is a distributed EPDCCH-PRB set including a plurality of distributed ECCEs having EREGs from a plurality of PRB-pairs.

Various embodiments provide one or more non-transitory computer-readable media having instructions, stored thereon, that when executed enable a UE to: receive configuration parameters from an eNB for a first EPDCCH-PRB set including a first number of PRB-pairs; receive configuration parameters from the eNB for a second EPDCCH-PRB set including a second number of PRB-pairs; receive a first set of EPDCCH candidates from the eNB, wherein the individual EPDCCH candidates correspond to one or more ECCEs of the first EPDCCH-PRB set which the UE is to monitor for an EPDCCH; and receive a second set of EPDCCH candidates from the eNB, wherein the individual EPDCCH candidates of the second set of EPDCCH candidates correspond to one or more ECCEs of the second EPDCCH-PRB set which the UE is to monitor for an EPDCCH; wherein a ratio of a number of EPDCCH candidates in the first set of EPDCCH candidates to a number of EPDCCH candidates in the second set of EPDCCH candidates is about equal to a ratio of the first number of PRB-pairs to the second number of PRB-pairs.

In some embodiments, the first and second EPDCCH-PRB sets are both configured as distributed EPDCCH-PRB sets having distributed ECCEs or both configured as localized EPDCCH-PRB sets having localized ECCEs.

In some embodiments, the first EPDCCH-PRB set is configured as a localized EPDCCH-PRB set having localized ECCEs and the second EPDCCH-PRB set is configured as a distributed EPDCCH-PRB set having distributed ECCEs.

In some embodiments, the first number of PRB-pairs is eight, the second number of PRB-pairs is four, and wherein the number of EPDCCH candidates in the first set of EPDCCH candidates is twice the number of EPDCCH candidates in the second set of EPDCCH candidates.

In various embodiments, an apparatus to be employed by an eNB to facilitate transmission of a control channel to a UE includes: means to configure, for the UE, an EPDCCH-PRB set including a plurality of PRB-pairs, wherein the EPDCCH-PRB set is configured as a distributed EPDCCH-PRB set having distributed ECCEs that include EREGs spread among the plurality of PRB-pairs; and means to determine a set of distributed EPDCCH candidates for the UE from the PRB-pairs of the EPDCCH-PRB set, wherein the individual distributed EPDCCH candidates include one or more of the distributed ECCEs, and wherein the different distributed EPDCCH candidates of the set of distributed EPDCCH candidates are first mapped to distributed ECCEs including EREGs of different localized ECCEs of the PRB-pairs, and then mapped to distributed ECCEs including EREGs of a same localized ECCE as another distributed EPDCCH candidate.

In some embodiments, the EPDCCH-PRB set is a first EPDCCH-PRB set, the set of distributed EPDCCH candidates is determined based on a search space equation, and the apparatus further includes: means to configure, for the UE or another UE, a second EPDCCH-PRB set including a plurality of PRB-pairs that are fully overlapped, partially overlapped, or fully non-overlapped with the PRB-pairs of the first EPDCCH-PRB set, wherein the second EPDCCH-PRB set is configured as a localized EPDCCH-PRB set including a plurality of localized ECCEs having EREGs of a same PRB-pair; and means to determine, based on the search space equation, a set of localized EPDCCH candidates for the UE or the another UE from the second EPDCCH-PRB set.

In some embodiments, the set of localized EPDCCH candidates includes localized ECCEs of each of the plurality of PRB-pairs of the second EPDCCH-PRB set.

In some embodiments, the EPDCCH-PRB set includes four PRB-pairs and sixteen distributed ECCEs, and the individual PRB-pairs include four localized ECCEs In various embodiments, an apparatus to be employed by an eNB to facilitate transmission of control information: one or more computer-readable storage media configured to store a plurality of instructions; and one or more processors coupled to the one or more computer-readable storage media, the one or more processors, in response to executing the plurality of instructions, being configured to: configure, for one or more UEs, a localized EPDCCH-PRB set having a plurality of localized ECCEs, and a distributed EPDCCH-PRB set having a plurality of distributed ECCEs; and determine, based on a search space equation, a set of localized EPDCCH candidates, wherein the individual localized EPDCCH candidates correspond to one or more localized ECCEs of the localized EPDCCH-PRB set; and determine, based on the search space equation, a set of distributed EPDCCH candidates, wherein the individual distributed EPDCCH candidates correspond to one or more of the distributed ECCEs of the distributed EPDCCH-PRB set.

In some embodiments, the set of localized EPDCCH candidates includes ECCEs of each of the plurality of PRB-pairs of the localized EPDCCH-PRB set.

In some embodiments, the different distributed EPDCCH candidates of the set of distributed EPDCCH candidates are first mapped to distributed ECCEs including EREGs of different localized ECCEs of the PRB-pairs, and then mapped to distributed ECCEs including EREGs of a same localized ECCE as another distributed EPDCCH candidate.

In some embodiments, the localized ECCEs are associated with a first set of PRB-pairs, wherein the distributed ECCEs are associated with a second set of PRB-pairs, and wherein the first and second sets of PRB-pairs include one or more common PRB-pairs.

In some embodiments, the distributed EPDCCH candidates have an aggregation level indicating a number of distributed ECCEs included in the individual distributed EPDCCH candidates, wherein the distributed EPDCCH candidates have an aggregation level of 2 or greater, and wherein the individual distributed EPDCCH candidates are first mapped to distributed EREGs from a same set of localized ECCEs of the PRB-pairs, and then mapped to distributed EREGs from a different set of localized ECCEs if no EREGs in the same set of localized ECCEs are available.

Various embodiments provide an apparatus to be employed by an eNB to facilitate transmission of a control channel, the apparatus including: means for configuring, for a user equipment (UE), a first enhanced physical downlink control channel (EPDCCH) physical resource block (PRB) set including a plurality of enhanced control channel elements (ECCEs); means for configuring, for the UE, a second EPDCCH-PRB set including a plurality of ECCEs; means for determining, based on a first starting candidate index, a first set of EPDCCH candidates corresponding to one or more ECCEs of the first EPDCCH-PRB set; and means for determining, based on a second starting candidate index that is different from the first starting candidate index, a second set of EPDCCH candidates corresponding to one or more ECCEs of the second EPDCCH-PRB set.

In some embodiments, the first and second starting candidate indexes are separated by a pre-defined offset.

In some embodiments, the first and second starting candidate indexes are independently determined using different random numbers.

In some embodiments, the first set of EPDCCH candidates includes localized EPDCCH candidates corresponding to one or more localized ECCEs having EREGs of a same PRB-pair, and wherein the second set of EPDCCH candidates includes distributed EPDCCH corresponding to one or more ECCEs having EREGs from a plurality of PRB-pairs.

In some embodiments, the apparatus further includes means for transmitting an EPDCCH for the UE on an EPDCCH candidate of the first or second set of EPDCCH candidates.

Various embodiments provide an apparatus to be employed by a UE to facilitate receipt of control information, the apparatus including: means to receive configuration parameters from an eNB for a first EPDCCH-PRB set including a first number of PRB-pairs; means to receive configuration parameters from the eNB for a second EPDCCH-PRB set including a second number of PRB-pairs; means to receive a first set of EPDCCH candidates from the eNB, wherein the individual EPDCCH candidates correspond to one or more enhanced control channel elements (ECCEs) of the first EPDCCH-PRB set which the UE is to monitor for an EPDCCH; and means to receive a second set of EPDCCH candidates from the eNB, wherein the individual EPDCCH candidates of the second set of EPDCCH candidates correspond to one or more ECCEs of the second EPDCCH-PRB set which the UE is to monitor for an EPDCCH; wherein a ratio of a number of EPDCCH candidates in the first set of EPDCCH candidates to a number of EPDCCH candidates in the second set of EPDCCH candidates is about equal to a ratio of the first number of PRB-pairs to the second number of PRB-pairs.

In some embodiments, the first and second EPDCCH-PRB sets are both configured as distributed EPDCCH-PRB sets having distributed ECCEs or both configured as localized EPDCCH-PRB sets having localized ECCEs.

In some embodiments, the first EPDCCH-PRB set is configured as a localized EPDCCH-PRB set having localized ECCEs and the second EPDCCH-PRB set is configured as a distributed EPDCCH-PRB set having distributed ECCEs.

In some embodiments, the first number of PRB-pairs is eight, the second number of PRB-pairs is four, and wherein the number of EPDCCH candidates in the first set of EPDCCH candidates is twice the number of EPDCCH candidates in the second set of EPDCCH candidates.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. One or more non-transitory computer-readable media having instructions, stored thereon, that when executed cause an evolved Node B (eNB) to:
configure, for a user equipment (UE) of a wireless communication network, a distributed enhanced physical downlink control channel (EPDCCH)-physical resource block (PRB) set;
determine a set of distributed EPDCCH candidates for the UE from the distributed EPDCCH-PRB set, wherein a set of distributed enhanced control channel elements (ECCEs) corresponding to an EPDCCH candidate m of the set of distributed EPDCCH candidates is given by $$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor\right\} + i;$$

where p is an identifier of the set of distributed EPDCCH candidates; $Y_{p,k}$ is a starting candidate index for the set of distributed EPDCCH candidates; L is an aggregation level of an EPDCCH to be transmitted on one of the distributed EPDCCH candidates; $M_p^{(L)}$ is a number of EPDCCH candidates in the set of distributed EPDCCH candidates; k is a subframe associated with the UE; $N_{ECCE,p,k}$ is a total number of ECCEs in a control region of subframe k in the wireless communication network; i=0, . . . , L−1; m=0, 1, . . . , $M_p^{(L)}$−1; and b is equal to a carrier indicator field value for a serving cell associated with the set of distributed EPDCCH candidates or 0; and
    transmit an EPDCCH to the UE on one or more of the distributed EPDCCH candidates.

2. The one or more media of claim 1, wherein the distributed EPDCCH-PRB set includes a plurality of PRB-pairs, and wherein distributed ECCEs of the distributed EPDCCH-PRB set include enhanced resource element groups (EREGs) spread among the plurality of PRB-pairs.

3. The one or more media of claim 1, wherein the distributed EPDCCH-PRB set includes four PRB-pairs and sixteen distributed ECCEs, and wherein the individual PRB-pairs include four localized ECCEs.

4. The one or more media of claim 1, wherein the set of distributed EPDCCH candidates is a first set of EPDCCH candidates, wherein the instructions, when executed, further cause the eNB to determine a second set of EPDCCH candidates for the UE, and wherein the first and second sets of EPDCCH candidates are determined based on respective first and second starting candidate indexes that are different from one another.

5. The one or more media of claim 1, wherein the instructions, when executed, further cause the eNB to:
    configure, for the UE or another UE, a localized EPDCCH-PRB set including a plurality of localized ECCEs, individual localized ECCEs having EREGs of a same PRB-pair;
    determine a set of localized EPDCCH candidates for the UE or the another UE from the localized EPDCCH-PRB set, wherein the localized EPDCCH candidates are determined according to $$L\left\{\left(Y_{p,k}+\left\lfloor\frac{m\cdot N_{ECCE,p,k}}{L\cdot M_p^{(L)}}\right\rfloor+b\right)\mathrm{mod}\lfloor N_{ECCE,p,k}/L\rfloor\right\}+i;$$

and
    transmit another EPDCCH to the UE or the another UE on one or more of the localized EPDCCH candidates.

6. The one or more media of claim 1, wherein the instructions, when executed, further cause the eNB to:
    configure, for the UE or another UE, a localized EPDCCH-PRB set including a plurality of localized ECCEs, wherein individual localized ECCEs have EREGs of a same PRB-pair, and wherein the localized EPDCCH-PRB set includes one or more common resources with the distributed EPDCCH-PRB set;
    determine a set of localized EPDCCH candidates for the UE or the another UE from the localized EPDCCH-PRB set; and
    transmit another EPDCCH to the UE or the another UE on one or more of the localized EPDCCH candidates.

7. The one or more media of claim 4, wherein the first and second starting candidate indexes are separated by a predefined offset.

8. One or more non-transitory computer-readable media having instructions, stored thereon, that when executed by one or more processors of a user equipment (UE) in a wireless communication network, cause the UE to:
    determine a set of distributed enhanced physical downlink control channel (EPDCCH) candidates from a distributed EPDCCH-physical resource block (PRB) set, wherein a set of distributed enhanced control channel elements (ECCEs) corresponding to an EPDCCH candidate m of the set of distributed EPDCCH candidates is given by $$L\left\{\left(Y_{p,k}+\left\lfloor\frac{m\cdot N_{ECCE,p,k}}{L\cdot M_p^{(L)}}\right\rfloor+b\right)\mathrm{mod}\lfloor N_{ECCE,p,k}/L\rfloor\right\}+i;$$

where p is an identifier of the set of distributed EPDCCH candidates; $Y_{p,k}$ is a starting candidate index for the set of distributed EPDCCH candidates; L is an aggregation level of an EPDCCH to be transmitted on one of the distributed EPDCCH candidates; $M_p^{(L)}$ is a number of EPDCCH candidates in the set of distributed EPDCCH candidates; k is a subframe associated with the UE; $N_{ECCE,p,k}$ is a total number of ECCEs in a control region of subframe k in the wireless communication network; i=0, . . . , L−1; m=0, 1, . . . , $M_p^{(L)}$−1; and b is equal to a carrier indicator field value for a serving cell associated with the set of distributed EPDCCH candidates or 0; and
    monitor the distributed EPDCCH candidates for an EPDCCH including downlink control information (DCI) for the UE.

9. The one or more media of claim 8, wherein the instructions, when executed, further cause the UE to obtain configuration instructions, via wireless signaling from an evolved Node B (eNB) of the wireless communication network, for the distributed EPDCCH-PRB set.

10. The one or more media of claim 8, wherein the distributed EPDCCH-PRB set includes a plurality of PRB-pairs, and wherein distributed ECCEs of the distributed EPDCCH-PRB set include enhanced resource element groups (EREGs) spread among the plurality of PRB-pairs.

11. The one or more media of claim 8, wherein the distributed EPDCCH-PRB set includes four PRB-pairs and sixteen distributed ECCEs, and wherein the individual PRB-pairs include four localized ECCEs.

12. The one or more media of claim 8, wherein the set of distributed EPDCCH candidates is a first set of EPDCCH candidates, wherein the instructions, when executed, further cause the UE to determine a second set of EPDCCH candidates for the UE, and wherein the first and second sets of EPDCCH candidates are determined based on respective first and second starting candidate indexes that are different from one another.

13. The one or more media of claim 8, wherein the instructions, when executed, further cause the UE to:
    determine a set of localized EPDCCH candidates from a localized EPDCCH-PRB set including a plurality of localized ECCEs, wherein individual localized ECCEs have EREGs of a same PRB-pair, and wherein the localized EPDCCH candidates are determined according to $$L\left\{\left(Y_{p,k}+\left\lfloor\frac{m\cdot N_{ECCE,p,k}}{L\cdot M_p^{(L)}}\right\rfloor+b\right)\mathrm{mod}\lfloor N_{ECCE,p,k}/L\rfloor\right\}+i;$$

and monitor the localized EPDCCH candidates for another EPDCCH including DCI for the UE.

14. The one or more media of claim 8, wherein the instructions, when executed, further cause the UE to:

determine a set of localized EPDCCH candidates from a localized EPDCCH-PRB set including a plurality of localized ECCEs, wherein individual localized ECCEs have EREGs of a same PRB-pair, and wherein the localized EPDCCH-PRB set includes one or more common resources with the distributed EPDCCH-PRB set; and monitor the localized EPDCCH candidates for another EPDCCH including DCI for the UE.

15. The one or more media of claim 8, wherein the instructions, when executed, further cause the UE to receive the EPDCCH on one or more of the distributed EPDCCH candidates.

16. The one or more media of claim 12, wherein the first and second starting candidate indexes are separated by a pre-defined offset.

17. An evolved Node B (eNB) comprising:

one or more processors;

a memory coupled to the one or more processors, the memory having instructions, stored thereon, that when executed by the one or more processors, cause the eNB to:

determine a first set of enhanced physical downlink control channel (EPDCCH) candidates for a user equipment (UE) using enhanced control channel elements (ECCEs) that are selected from a first EPDCCH-physical resource block (PRB) set based on a first starting candidate index;

determine a second set of EPDCCH candidates for the UE using ECCEs that are selected from a second EPDCCH-PRB set based on a second starting candidate index that is different from the first starting candidate index; and transmit an EPDCCH to the UE on one or more EPDCCH candidates of the first set of EPDCCH candidates or the second set of EPDCCH candidates.

18. The eNB of claim 17, wherein the first set of EPDCCH candidates and the second set of EPDCCH candidates include resources of a same subframe.

19. The eNB of claim 17, wherein the first and second starting candidate indexes are separated by a pre-defined offset.

20. The eNB of claim 17, wherein the first and second starting candidate indexes are independently determined using different random numbers.

21. The eNB of claim 17, wherein the first EPDCCH-PRB set is a localized EPDCCH-PRB set including a plurality of localized ECCEs having enhanced resource element groups (EREGs) of a same PRB-pair, and the second EPDCCH-PRB set is a distributed EPDCCH-PRB set including a plurality of distributed ECCEs having EREGs from a plurality of PRB-pairs.

* * * * *

UNITED STATES PATENT AND TRADEMARK OFFICE
CERTIFICATE OF CORRECTION

PATENT NO.        : 9,603,095 B2
APPLICATION NO.   : 15/171402
DATED             : March 21, 2017
INVENTOR(S)       : Yuan Zhu et al.

It is certified that error appears in the above-identified patent and that said Letters Patent is hereby corrected as shown below:

In the Claims

Column 18
Line 24, add a space between "k" and "in".

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*